(12) United States Patent
Johnes

(10) Patent No.: US 11,019,799 B2
(45) Date of Patent: Jun. 1, 2021

(54) DISPOSABLE LINER FOR AN ANIMAL LITTER BOX

(71) Applicant: Alfa-Pet Inc., St. Louis, MO (US)

(72) Inventor: Martin A. Johnes, Godfrey, IL (US)

(73) Assignee: Alfa-Pet, Inc., St. Louis, MO (US)

( * ) Notice: Subject to any disclaimer, the term of this patent is extended or adjusted under 35 U.S.C. 154(b) by 878 days.

(21) Appl. No.: 15/804,481

(22) Filed: Nov. 6, 2017

(65) Prior Publication Data

US 2019/0133071 A1 May 9, 2019

(51) Int. Cl.
*A01K 1/01* (2006.01)
*B65D 33/28* (2006.01)

(52) U.S. Cl.
CPC ............ *A01K 1/0107* (2013.01); *B65D 33/28* (2013.01)

(58) Field of Classification Search
CPC .... A01K 1/0125; A01K 1/0107; B65D 33/28; B65D 5/60
USPC ........ 119/170, 168, 167; 229/117.35, 117.27
See application file for complete search history.

(56) References Cited

U.S. PATENT DOCUMENTS

| | | | |
|---|---|---|---|
| 3,684,155 A * | 8/1972 | Smith | A01K 1/0125 229/117.07 |
| 4,279,217 A | 7/1981 | Behringer | |
| 4,615,300 A | 10/1986 | McDonough | |
| 4,648,349 A * | 3/1987 | Larson | A01K 1/0125 119/168 |
| 4,813,374 A * | 3/1989 | Sides | A01K 1/0107 119/170 |
| 4,836,141 A | 6/1989 | Whitfield | |
| 5,207,772 A | 5/1993 | Lauretta et al. | |
| 5,488,929 A | 2/1996 | Pierson et al. | |
| 5,709,171 A | 1/1998 | Moore, III | |
| 5,758,601 A * | 6/1998 | Dickson | A01K 1/0125 119/168 |
| 5,850,798 A | 12/1998 | Engel | |
| 5,918,567 A | 7/1999 | Roth | |
| 8,360,006 B2 | 1/2013 | Lechaton et al. | |
| 8,387,568 B2 * | 3/2013 | Savicki | A01K 1/0107 119/170 |
| 8,438,994 B2 | 5/2013 | Stratton | |
| 9,681,640 B2 | 6/2017 | Miller | |
| 2009/0241851 A1 * | 10/2009 | Peddycoart | A01K 1/0107 119/168 |
| 2016/0165831 A1 | 6/2016 | Adams et al. | |
| 2017/0042114 A1 | 2/2017 | Waid | |
| 2017/0118946 A1 | 5/2017 | Sareyani | |

* cited by examiner

*Primary Examiner* — Yvonne R Abbott-Lewis
(74) *Attorney, Agent, or Firm* — Armstrong Teasdale LLP

(57) ABSTRACT

In one aspect, a disposable liner for a litter box is provided. The liner includes a base comprising a first end edge, a second end edge opposite the first end edge, a first seam edge, and a second seam edge opposite the first seam edge. The first seam edge and the second seam edge extend between the first end edge and the second end edge. The liner also includes a first side wall coupled to the base at the first end edge, a second side wall coupled to the base at the second end edge, a first end wall coupled to the base at the first seam edge, and a second end wall coupled to the base at the second seam edge. The first end wall comprises an integrally formed first gusset, and the second end wall comprises an integrally formed second gusset.

20 Claims, 6 Drawing Sheets

DISPOSABLE LINER FOR AN ANIMAL LITTER BOX

BACKGROUND

The field of the disclosure relates generally to liners for animal litter boxes, and more particularly to a disposable liner for litter boxes and methods from forming the liner from a material.

Liners are commonly used in conjunction with animal litter boxes to provide a barrier between the litter (and any animal waste) and the litter box. This facilitates protection of the box and mitigates the need to clean the box after use. These liners also facilitate disposal of used litter and animal waste with relative ease. That is, once the liner is used, the liner can be removed, along with the enclosed waste, and disposed of. A new liner can then be placed in the animal litter box.

Such liners are often made in the form of a typical "bag-like" structure. This can cause problems when the bag becomes filled with a large quantity of litter and animal waste. For example, if too much litter/waste is contained in the liner, lifting the liner for disposal may cause a tear or break in the liner. Such liners also form problematic folds if they do not fit the bottom of the box properly and/or if the liners include seams that extend along a bottom of the litter box when deployed. This leads to trapping of waste between the folds and seams which can lead to unpleasant odors.

BRIEF DESCRIPTION

In one aspect, a disposable liner for a litter box is provided. The liner includes a base comprising a first end edge, a second end edge opposite the first end edge, a first seam edge, and a second seam edge opposite the first seam edge. The first seam edge and the second seam edge extend between the first end edge and the second end edge. A first side wall is coupled to the base at the first end edge, the first side wall comprising a first top edge. A second side wall is coupled to the base at the second end edge, the second side wall comprising a second top edge. A first end wall coupled to the base at the first seam edge, the first end wall comprising a first gusset integrally formed with the first end wall. A second end wall coupled to the base at the second seam edge, the second end wall comprising a second gusset integrally formed with the second end wall.

In another aspect, a method is provided for forming a disposable liner for litter box from a material in a first configuration that includes a first gusset and an opposite substantially parallel second gusset coupling a first panel and an opposite second panel together, the first panel and the second panel further coupled together along a base edge. The method comprises folding the material from the first configuration into a second configuration by rotating the first and second panels about the base edge such that a first portion of the first panel overlaps a second portion of the first panel, a first portion of the second panel overlaps a second portion of the second panel, and the first gusset and the second gusset are substantially aligned with one another and with the base edge. The method further comprises removing a first corner portion of the material to form a first seam edge by cutting the first corner portion substantially perpendicular to the first gusset, and sealing the first seam edge. The method also comprises removing a second corner portion of the material opposite the first corner portion to form a second seam edge by cutting the second corner portion substantially perpendicular to the second gusset, and sealing the second seam edge. The method still further comprises positioning the disposable liner for insertion into a litter box by rotating the first gusset about the first seam edge, and rotating the second gusset about the second seam edge.

In yet another aspect, a litter box system is provided. The system includes a litter box for an animal and a disposable liner cavity suitable for lining the litter box. The disposable liner cavity comprises a base comprising a first end edge, a second end edge opposite the first end edge, a first seam edge, and a second seam edge opposite the first seam edge. The disposable liner cavity also comprises a first side wall coupled to the base at the first end edge, the first side wall comprising a first top edge, and a second side wall including a second top edge coupled to the base at the second end edge, the second side wall comprising a second top edge. The disposable liner cavity further comprises a first end wall coupled to the base at the first seam edge, the first end wall comprising a first gusset integrally formed with the first end wall. The disposable liner cavity still further comprises a second end wall coupled to the base at the second seam edge, the second end wall comprising a second gusset integrally formed with the second end wall. The disposable liner cavity additionally includes a tying member suitable for closing the liner cavity and removing the disposable liner from the litter box.

DETAILED DESCRIPTION

Figure 1:
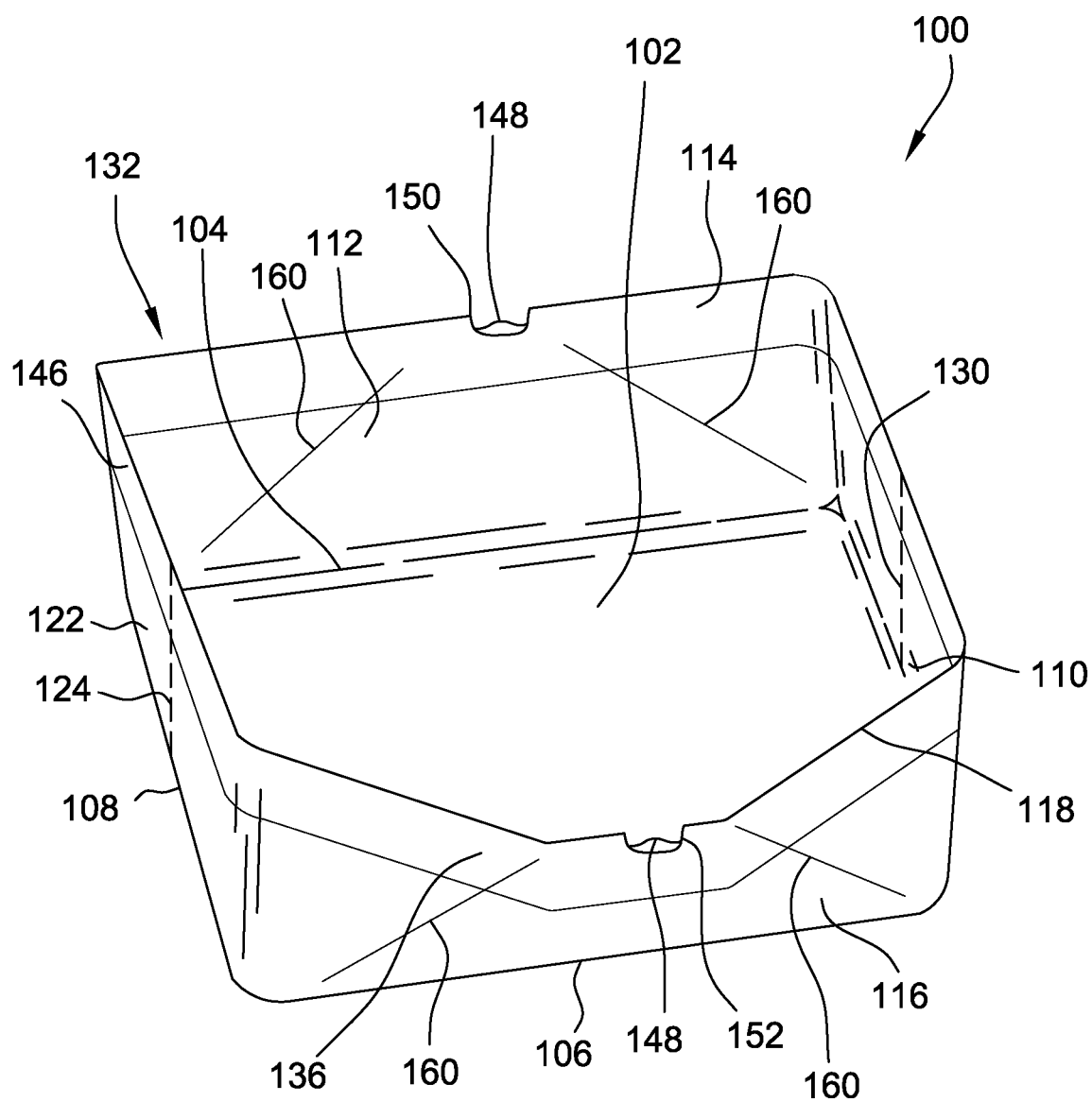
FIG. 1 shows a perspective view of an example embodiment of a liner for use with a litter box.

The following detailed description illustrates the disclosure by way of example and not by way of limitation. The description clearly enables one skilled in the art to make and use the disclosure, describes several embodiments, adaptations, variations, alternatives, and use of the disclosure, including what is presently believed to be the best mode of carrying out the disclosure.

The present disclosure describes a disposable liner for an animal litter box. The liner is suitable for fitting litter boxes of various sizes, and holding litter and animal waste. The liner includes a first seam and a second seam that at least partially define a flat base. The flat base is configured to line the flat bottom surface of a litter box and prevent folds from forming in the liner when the liner is in place inside the litter box. In particular, the flat base described herein prevents the folding which occurs with known liners that have a seam or seams extending through the base of the liner. The flat base of the liner prevents clumps of animal waste and/or pools of animal urine that would accumulate within any folds on the base surface of the liner. The liner further includes a first gusset and a second gusset, both integrally formed with the liner, and which provide rigidity to the liner. The rigidity enables the liner to, at least partially, maintain its shape when lifting the bag full of litter/waste for disposal. The liner is formed from a liner material using a forming method, described in detail below. The method forms a structurally strong liner for a litter box that does not require high manufacturing costs to produce.

In the example embodiment, the liner is suitable to be used for lining a cat or other animal litter box. In some embodiments, the liner is suitable for lining other animal litter boxes, such as but not limited to rabbit litter boxes and ferret litter boxes. The liner is further suitable to hold any suitable form of animal litter, such as but not limited to conventional clay litter, clay-based oil absorbent litter, cedar chips, sepiolite litter, zeolite litter, diatomite litter, and/or litters containing other ingredients including natural and/or synthetic ingredients.

The liner is formed of a flexible sheet material, such as but not limited to a flexible low-density polyethylene material, and/or a flexible high density polyethylene material. The material is strong enough to prevent tearing from animal scratches and is designed to carry a relatively large amount of litter and waste during disposal of the liner. The material is also sufficiently flexible to be used for lining litter boxes of various sizes.

In the example embodiment, the liner includes a base including a first end edge, a second end edge opposite the first end edge, a first seam edge, and a second seam edge opposite the first seam edge. The base is at least one of square-shaped and/or rectangular-shaped, to fit the bottom of a litter box. In some embodiments, the base may include other, different shapes that are configured to fit other litter boxes. The first seam edge and the second seam edge extend between the first end edge and the second end edge.

The liner includes a first side wall coupled to the base at the first end edge. The first side wall includes a first top edge. The liner further includes a second side wall opposite the first side wall including a second top edge coupled to the base at the second end edge. The second side wall includes a second top edge.

The liner further includes a first end wall coupled to the base at the first seam edge. The first end wall includes a first gusset integrally formed with the first end wall. The liner further includes a second end wall opposite the first end wall coupled to the base at the second seam edge. The second end wall includes a second gusset integrally formed with the second end wall.

The first top edge and the second top edge at least partially define an opening portion of the liner for insertion of litter and/or animal waste. The first side wall, the second side wall, the first end wall, the second end wall, and the base define a liner cavity for accessing an interior of the liner. Once the liner is fitted onto the litter box, the liner cavity may be substantially the same size as the box cavity in the litter box, wherein the box cavity is the interior portion of the box. The first side wall, second side wall, first end wall, second end wall, base, and opening portion define a liner cavity suitable for lining a litter box and placing litter and/or animal waste within the liner cavity.

In the example embodiment, a flap portion is located circumferentially along the top edge of the liner. More specifically, the flap portion is coupled to (or integral with) the top edge along the first side wall, the second side wall, the first end wall, and the second end wall. The flap portion is a piece of the liner that folds away relative to the liner cavity toward and over the rim of a litter box. In some embodiments, the flap portion may comprise an elastic material. The flap portion secures the liner on the litter box, specifically keeping the opening between the first top edge and the second top edge open for insertion of litter and animal waste.

In the example embodiment, the liner includes a tying member located adjacent the top edge. In the example embodiment, the tying member is positioned on the flap portion of the liner. Specifically, the portion of the liner that is folded over the edge defines a passageway for the tying member. The tying member is suitable for closing the opening portion of the liner. For example, when the liner is ready to be disposed of, the tying member is adjusted to reduce the opening portion of the liner (e.g., collapsing the top edges inwardly). The opening portion is reduced to a size that limits passage of animal waste from inside the liner to outside the liner, thereby preventing spillage of the litter and waste when transporting the used liner.

The tying member protrudes through flap openings, such that a user can grab hold of the ends of the tying member. In the example embodiment, the flap portion includes a first flap opening located on the first tope edge, and a second flap opening located on the second top edge. In some embodiments there may be more or less than two flap openings. In alternative embodiments where there is no tying member, there are no flap openings. In these embodiments, a user may manually tie the walls together to close the opening portion. The tying member may comprise one or more tying members and may be any suitable member capable of closing the opening of a bag, including but not limited to a drawstring, an elastic or stretchable-type band, a length of adhesive or sticky tape, and the like.

The liner includes at least one fold line along the walls of the liner for adjusting the shape of the liner (e.g., fitting along the side walls of the litter box, and/or folding the walls inward toward the liner cavity). In the example embodiment, the liner includes a first and second fold line located along the first side wall, and a third and fourth fold line along the second side wall. Other embodiments may include more or less fold lines along the walls of the liner.

The liner is formed from a material in a first configuration. In the example embodiment, the material includes a first gusset and an opposite substantially parallel second gusset coupling a first panel and an opposite second panel together, the first panel and the second panel further coupled together along a base edge. The base edge located paralleled to and opposite a top edge of each the first and second panel. The base edge is perpendicular to the first gusset and the second gusset. In the first configuration, the base edge is a fold line that couples the first panel and the second panel (see FIG. 2). In the example embodiment, the material of the first panel and the second panel is rectangular-shaped. In some embodiments, the material is square shaped.

To form the liner from the material, the material is folded from the first configuration into a second configuration. Specifically, the top edges of the first and second panels are pulled away from one another. Subsequently or simultaneously, the base edge fold line is "unfolded" such that the first gusset and the second gusset are aligned with each other as well as aligned with the base edge. Further, a portion of the first panel and a portion of the second panel become a flat base surface of what will be the liner cavity of the disposable liner.

Figure 3:
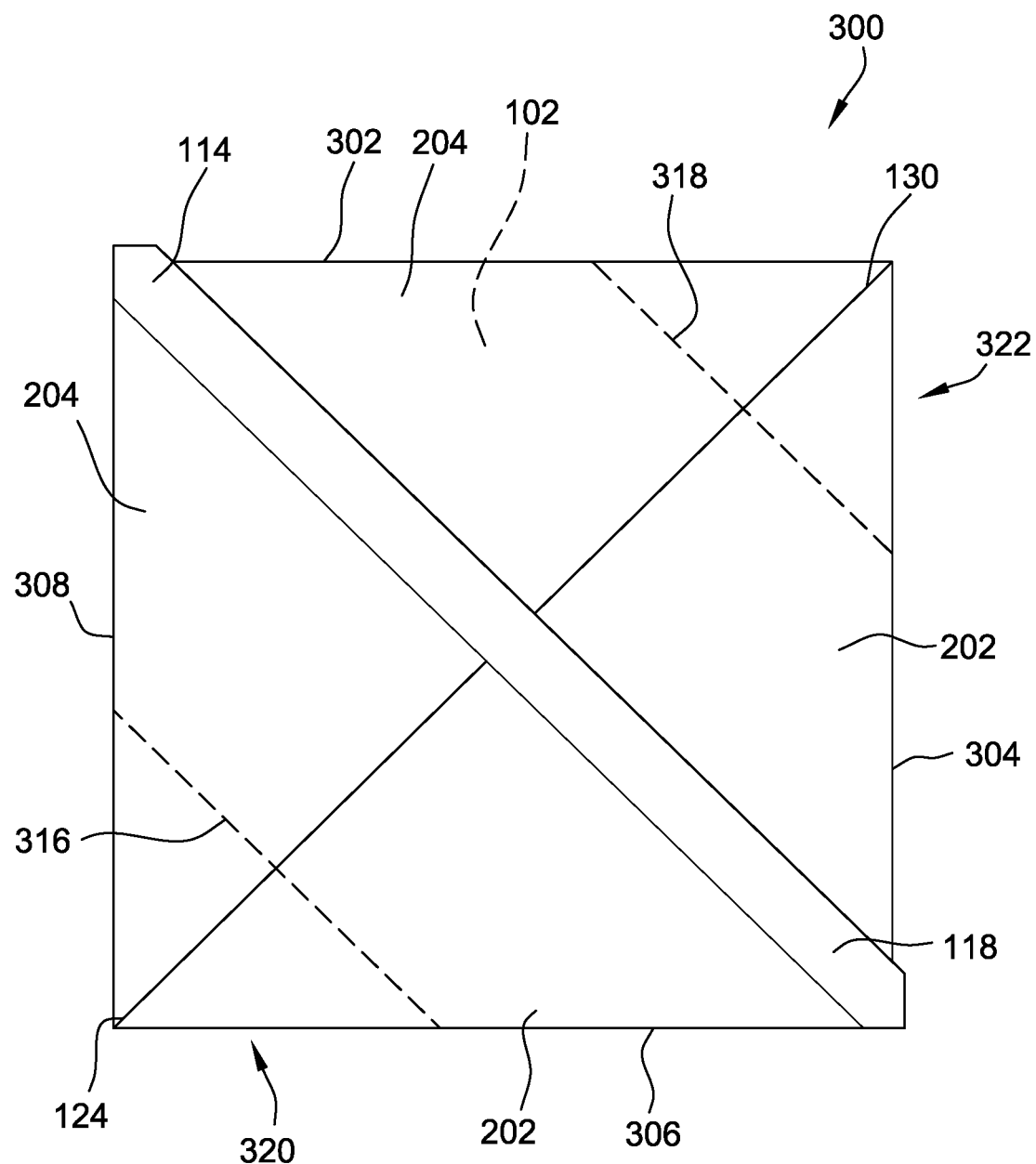
FIG. 3 is a second configuration front view of a material used to form the liner shown in FIG. 1.

In the second configuration, the first gusset and the second gusset are aligned with one another and are also perpendicular to the top edges of the first and second panels (as shown in FIG. 3). A flap portion is included along the top edges of the first panel and the second panel, such that the first panel and the second panel are split by the flap portion.

The second configuration further includes a first edge, a second edge coupled to and perpendicular to the first edge. The second configuration further includes a third edge located opposite the first edge, and coupled to and perpendicular to the second edge. The second configuration further includes a fourth edge located opposite the second edge, and coupled to and perpendicular to the first edge and the third edge. In the example embodiment, the second configuration is square shaped.

To form the disposable liner form the material in the second configuration, a third configuration is made by forming a first seam edge and a second seam edge. To form the third configuration, a first seam is formed along a first line extending perpendicularly through the first gusset, and a second seam is formed along a second line extending perpendicularly through the second gusset. The first seam and the second seam at least partially define a base panel, wherein the base panel is the base of the liner. In the example embodiment, to form the first seam edge and the second seam edge, a first corner portion and a second corner portion of the material are cut off from the second configuration. Specifically, the corners are cut off along the first line and the second line. The seams are then formed using any suitable method of joining different pieces of plastic material together. The third configuration is the liner described above said to be in a closed configuration, or an unexpanded configuration (see FIG. 4).

Figure 5:
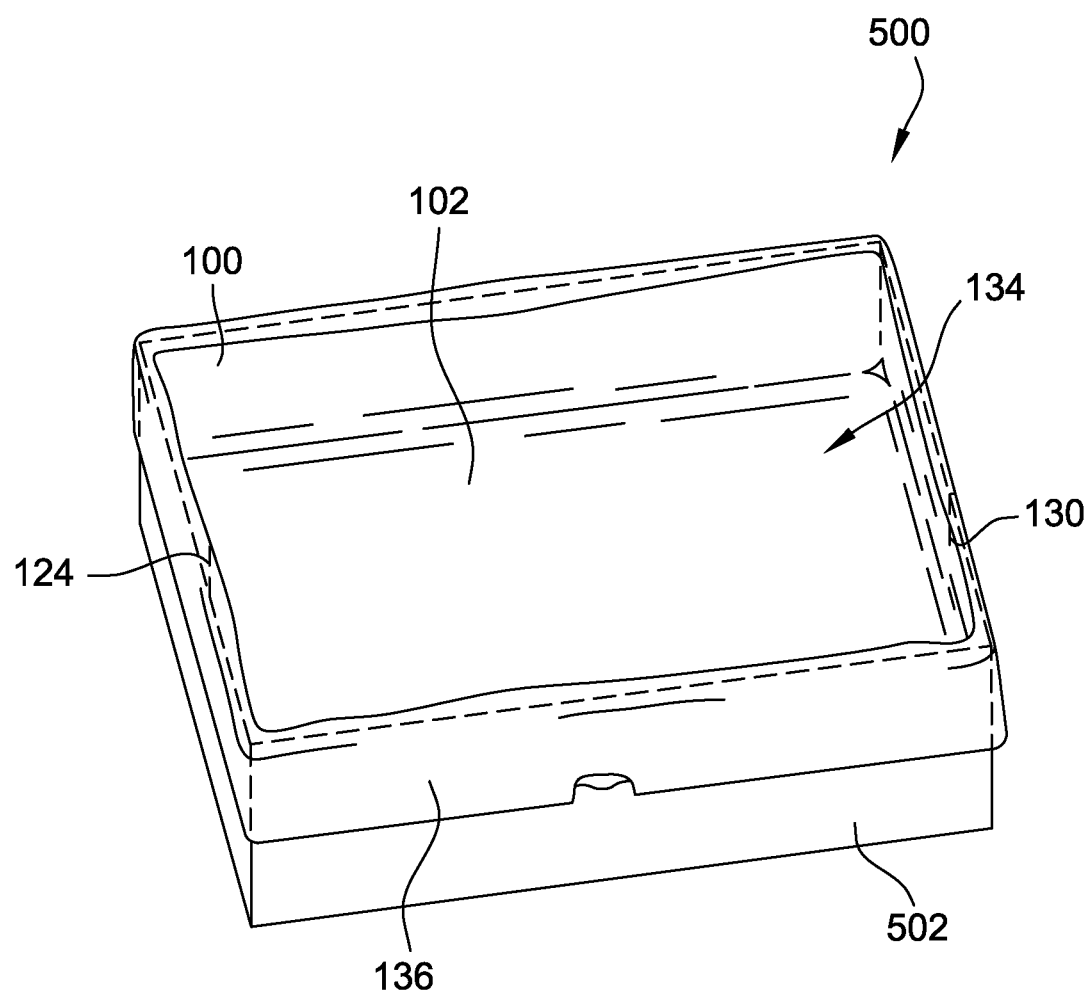
FIG. 5 is a perspective view of a liner system for use with a litter box.

To position the liner in a litter box, the liner is first converted from the closed configuration (shown in FIG. 3 and described below) to an open configuration (shown in FIGS. 1 and 5). In the open configuration, the base is aligned with interior bottom surface of the litter box. The first side wall, the second side wall, the first end wall, and the second end wall are aligned within corresponding sides located on the litter box.

The top edge (which may include a flap portion) is then pulled outwardly from the litter box and wrapped around a rim portion of the litter box in order to secure the liner. Litter may then be placed within the liner cavity of the liner for subsequent use.

After use, the liner may be disposed of. For example, when the litter box/liner combination is full of animal waste/litter, the liner may be grasped by the tying member and pulled upward. In the example embodiment, the tying member is used to close the bag by pulling the drawstrings out of the first and second flap openings, and the tying member is then tied together to seal the litter/waste within the liner. The liner may then be transported to be disposed of without spilling the litter/waste out of the liner. A new liner may then be placed within the existing litter box for further use.

FIG. 1 shows a perspective view of an example embodiment of a liner 100 for use with a litter box (not shown). As illustrated in FIG. 1, liner 100 includes a base 102 including a first end edge 104, a second end edge 106 opposite first end edge 104, a first seam edge 108, and a second seam edge 110 opposite first seam edge 108. As described above, base 102 is rectangular shaped so that liner 100 is sized to fit the base of the litter box. This sized fit prevents fold lines from collecting clumps of waste/urine. As described above, in some embodiments liner 100 is formed of at least one of a flexible low density polyethylene material, and a flexible high density polyethylene material.

Liner 100 further includes a first side wall 112 coupled to base 102 at first end edge 104. First side wall 112 includes a first top edge 114. A second side wall 116 is coupled to base 102 at second end edge 106. Second side wall 116 includes a second top edge 118. Second side wall 116 is opposite first side wall 112. First top edge 114 and second top edge 118 are integrally formed as top edge 146.

Liner 100 further includes a first end wall 122 coupled to base 102 at first seam edge 108. First end wall 122 includes a first gusset 124 integrally formed with first end wall. Liner 100 further includes a second end wall 128 opposite first end wall 122 coupled to base 102 at second seam edge 110. Second end wall 128 includes a second gusset 130 integrally formed with second end wall 128.

First top edge 114 and second top edge 118 at least partially define an opening portion 132 of liner 100 for insertion of litter and/or animal waste into liner 100. First side wall 112, second side wall 116, first end wall 122, second end wall 128, and base 102 define a liner cavity 134 for accessing the interior of liner 100 and placement and storage of litter/waste in liner 100. Once liner 100 is fitted onto the litter box, liner cavity 134 is substantially the same size as the box cavity in the litter box, wherein the box cavity is the interior portion of the box suitable for storage of litter/waste.

In the example embodiment, a flap portion 136 is located circumferentially along the first top edge 114 and second top edge 118. More specifically, flap portion 136 couples the top edges along first side wall 112, second side wall 116, first end wall 122, and second end wall 128. Flap portion 136 is the piece of liner 100 that folds backwards relative to liner cavity 134 toward and over the rim of a litter box 502 (shown in FIG. 5). This secures liner 100 onto litter box 502, specifically keeping the opening between first top edge 114 and second top edge 118 open for insertion of litter and animal waste.

As described above, flap portion 136 is a piece of liner 100 that folds towards the litter box and over the rim of a litter box. This positioning of liner 100 and flap portion 136 secures liner 100 on the litter box, specifically keeping the opening portion 132 suitable for insertion of litter and/or animal waste.

In the example embodiment, liner 100 includes a tying member 148 located adjacent to top edge 146 and inside flap portion 136 of liner 100. Top edge 146 is comprised of first top edge 114 and second top edge 118. Tying member 148 is suitable for closing opening portion 132 of liner 100. For example, when liner 100 is ready to be disposed of, tying member 148 will provide a sealing of opening portion 132, securing the litter/waste from inside liner 100 and preventing spillage of the litter/waste when transporting the used liner 100.

Tying member 148 protrudes through openings defined by the flap portion 136, such that a user can grab hold of the ends of tying member 148. In the example embodiment, flap portion 136 includes a first flap opening 150 located on first top edge 114, and a second flap opening 152 located on second top edge 118. In some embodiments, there may be more than two flap openings. In alternative embodiments where there is no tying member 148, there are no flap openings. In these embodiments, a user may manually tie the top edges of liner 100 together to close opening portion 132. Tying member 148 may be any suitable member capable of closing the opening of a bag, including but not limited to a drawstring and other tying members described herein.

As discussed above, liner 100 includes at least one fold line 160 along the walls of liner 100 for adjusting the shape of liner 100. In the example embodiment, liner 100 includes a first and second fold line 160 located along first side wall 112, and a third and fourth fold line 160 along second side wall 116. Other embodiments may include more or less fold lines 160.

Figure 2:
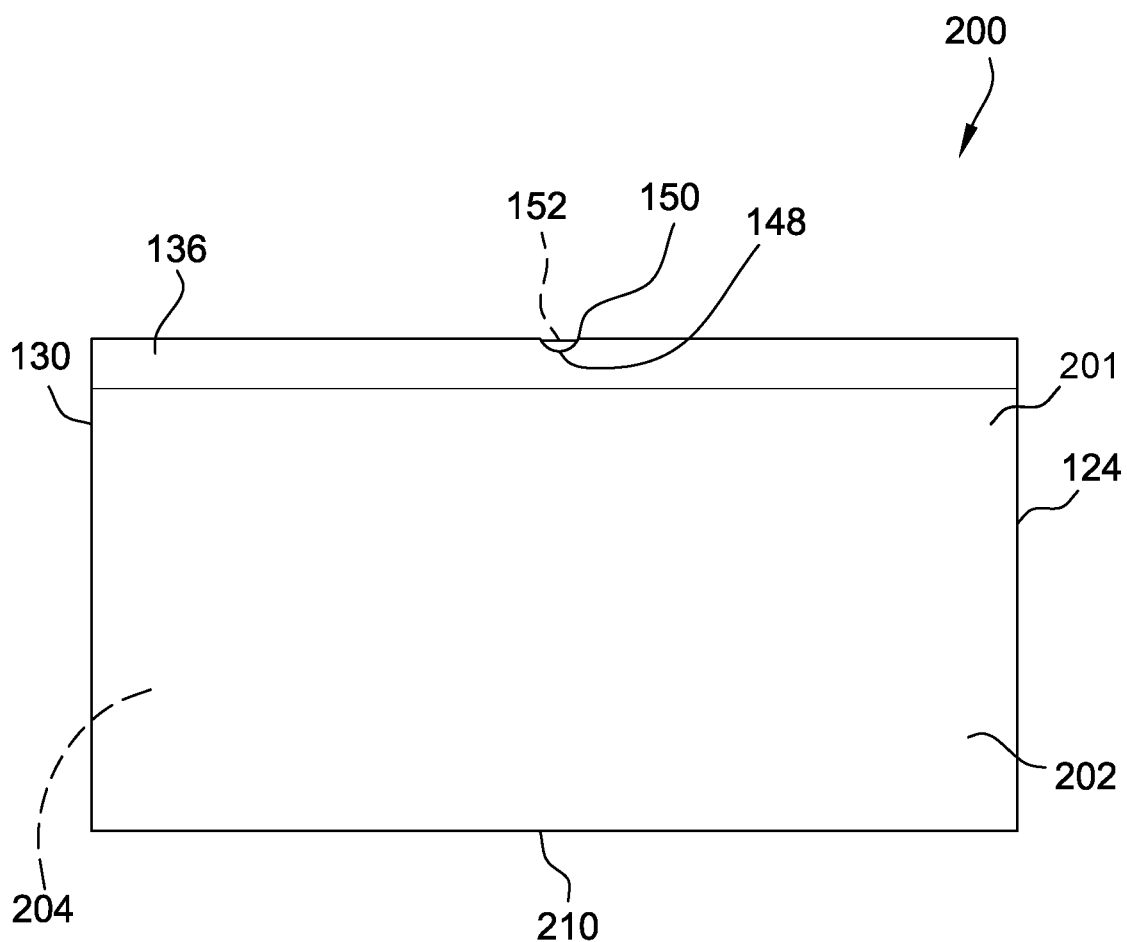
FIG. 2 is a first configuration front view of a material used to form the liner shown in FIG. 1.

FIG. 2 is a first configuration 200 front view of a material 201 used to form the liner 100 shown in FIG. 1. In the example embodiment, material 201 includes a first panel 202 and a second panel 204 located opposite and parallel to first panel 202, such that first panel 202 overlaps second panel 204. First panel 202 and second panel 204 are coupled along a base edge 210. First panel 202 and second panel 204 are also coupled about a first gusset 124 located perpendicular to base edge 210, and a second gusset 130 located opposite first gusset 124 and perpendicular to base edge 210. Base edge 210 is perpendicular to first gusset 124 (also shown in FIG. 1) and second gusset 130 (also shown in FIG. 1). Base edge 210 is a fold line that couples first panel 202 and second panel 204. Base edge 210 is opposite from and parallel to the top edges 114 and 118 of first panel 202 and second panel 204, respectively. In the example embodiment, material 201 is rectangular-shaped. In some embodiments, material 201 is square shaped.

FIG. 3 is a second configuration 300 front view of a material 201 used to form the liner 100 shown in FIG. 1. In the second configuration 300, first gusset 124 and second gusset 130 are aligned with one another and are also aligned with base edge 210 (whereas in the first configuration gussets 124 and 130 were perpendicular with base edge 210). Flap portion 136 runs along first panel 202 and second panel 204 perpendicular to gussets 124 and 130, such that first panel 202 and second panel 204 are each split by flap portion 136. The second configuration further includes a first edge 302 and a second edge 304 coupled to and perpendicular to first edge 302. The second configuration further includes a third edge 306 located opposite first edge 302, and coupled to and perpendicular to second edge 304. The second configuration further includes a fourth edge 308 located opposite second edge 304, and coupled to and perpendicular to first edge 302 and third edge 306. In the example embodiment, the second configuration is square shaped.

As described above, to form the second configuration from the first configuration, first panel 202 and second panel 204 are pulled away from one another by their top edges 114 and 118, respectively. Subsequently or simultaneously, base edge 210 fold line is "unfolded" such that first gusset 124 and second gusset 130 are aligned. Further, a portion of first panel 202 and a portion of second panel 204 become a flat base surface (e.g., base 102 shown in FIG. 1).

Figure 4:
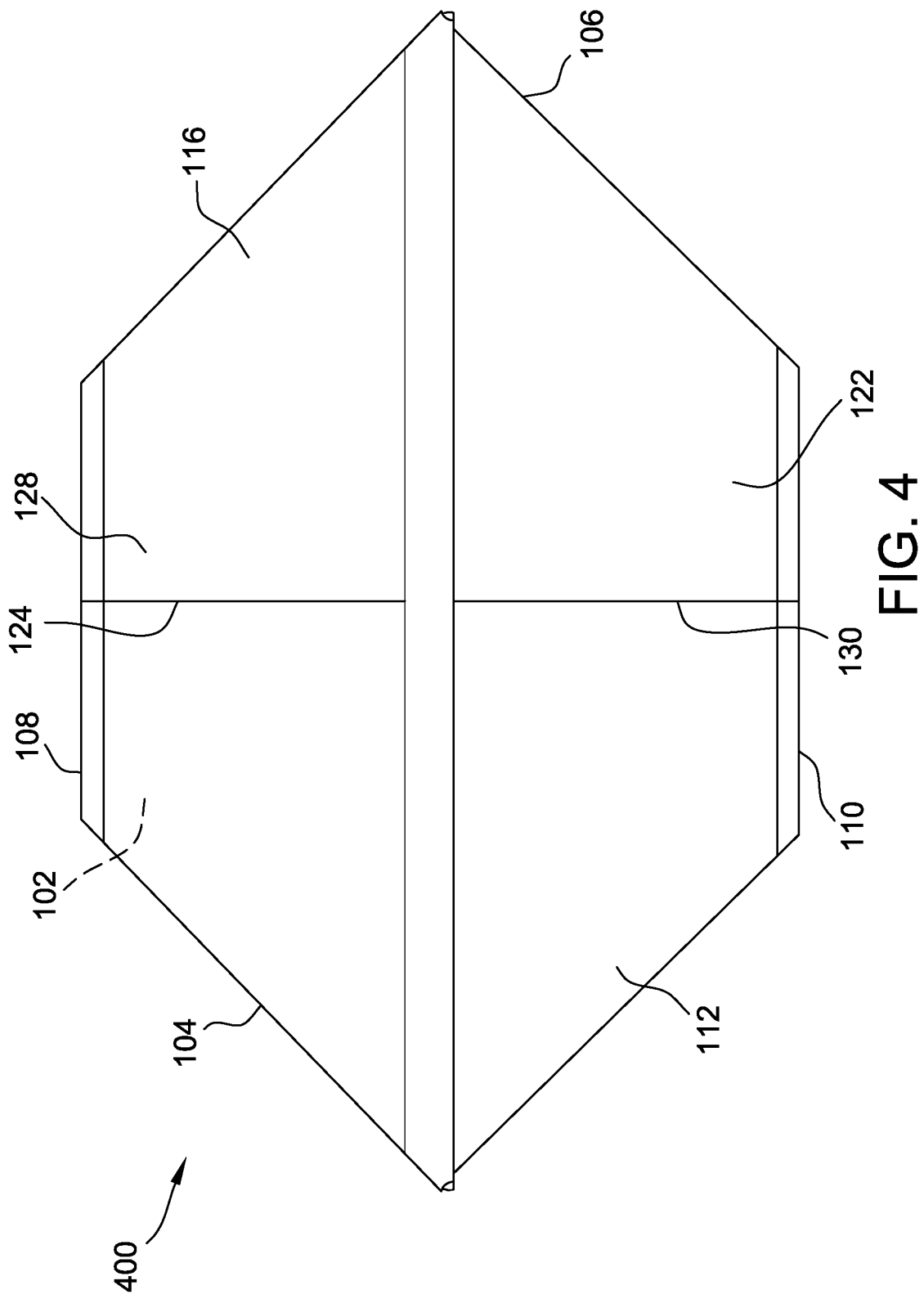
FIG. 4 is a closed configuration front view of the liner shown in FIG. 1.

FIG. 4 is a closed configuration 400 front view of the liner 100 shown in FIG. 1. Closed configuration 400 depicts liner 100 in a folded position. Closed configuration 400 includes base 102, first end edge 104, second end edge 106 opposite first end edge 104, first seam edge 108, and second seam edge 110 opposite first seam edge 108. Closed configuration 400 further includes a first side wall 112 coupled to base 102 at first end edge 104. First side wall 112 includes a first top edge 114. Closed configuration 400 further includes a second side wall 116 opposite first side wall 112 including a second top edge 118 coupled to base 102 at second end edge 106. First top edge 114 and second top edge 118 are integrally formed as top edge 146. Closed configuration 400 further includes a first end wall 122 coupled to base 102 at first seam edge 108. First end wall 122 includes a first gusset 124 integrally formed with first end wall 122. Liner 100 further includes a second end wall 128 opposite first end wall 122 coupled to base 102 at second seam edge 110. Second end wall 128 includes a second gusset 130 integrally formed with second end wall. In closed configuration 400, first end wall 122 and second end wall 128 are folded inward and on top of base 102. First side wall 112 and second side wall 116 extend outward away from base 102. Liner 100 is configured to lie flat when in a closed configuration and configured for positioning in litter box 502 (i.e. to line litter box 502) when in an open configuration.

First seam edge 108 is formed by cutting along a first line 316 (referring back to FIG. 3), wherein first line 316 extends perpendicularly through the first gusset 124, and removing first corner portion 320. Second seam edge 110 is formed by cutting along a second line 318 (Referring back to FIG. 3), wherein second line 318 extends perpendicularly through second gusset 130, and removing second corner portion 322.

FIG. 5 is a perspective view of a liner system 500 for use with litter box 502. Litter box 502 may be any type of litter box suitable for storing litter and/or animal waste. Liner 100 is sized to be used in conjuncture with multiple sized litter boxes 502. As described above, base 102 is aligned with the interior base surface of litter box 502. First side wall 112, second side wall 116, first end wall 122, and second end wall 128 are aligned with corresponding sides located on litter box 502.

First top edge 114 and second top edge 118 are extended outwardly towards the litter box 502, and wrapped around the rim portion of litter box 502 to secure liner 100. Litter may then be placed within liner cavity 134 of the liner for subsequent use.

Figure 6:
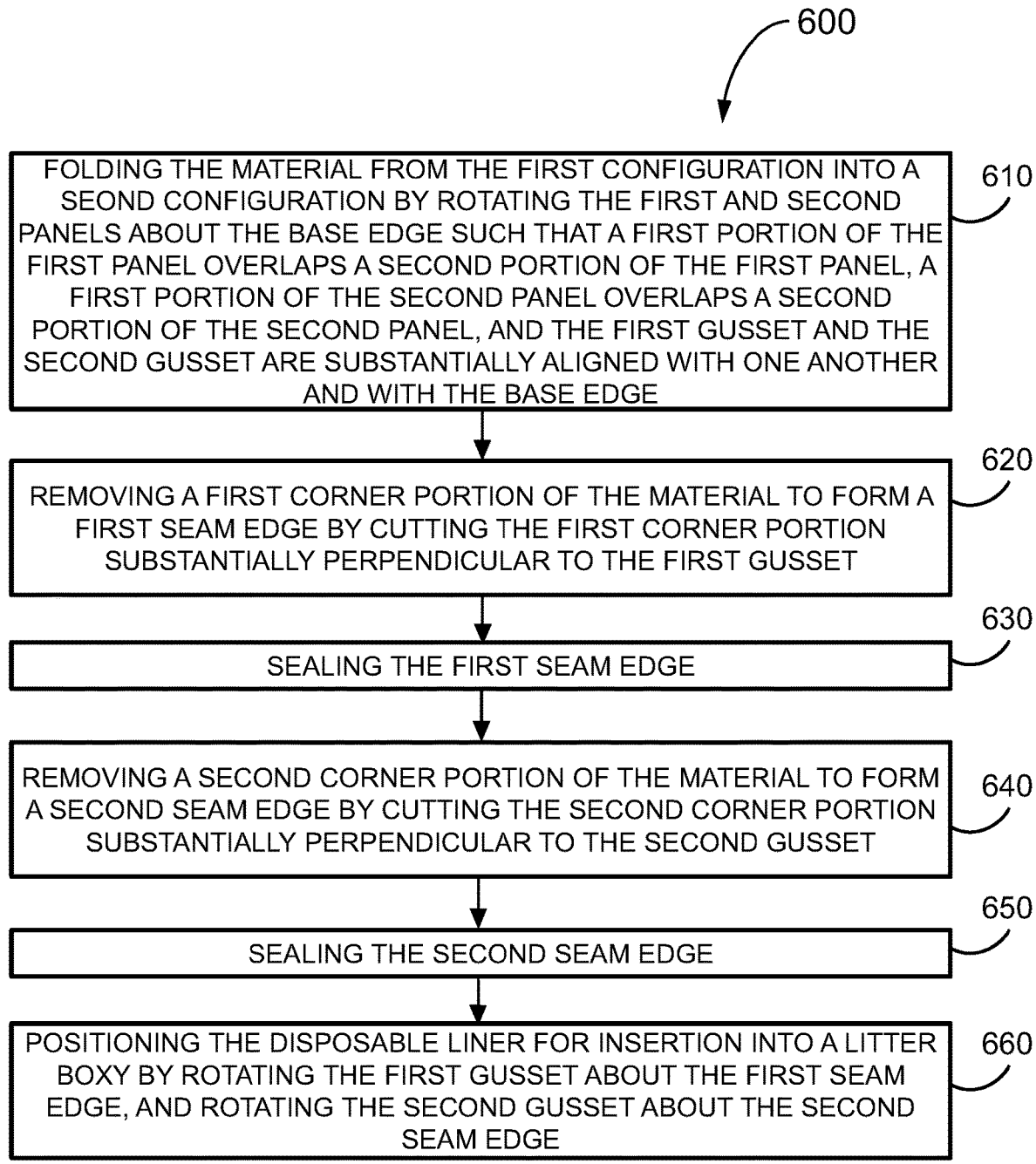
FIG. 6 is a flow diagram of a method for manufacturing a liner for a litter box.

FIG. 6 is a box diagram of a method 600 for forming a disposable liner for a litter box from a material in a first configuration. In the first configuration, the material includes a first gusset and an opposite substantially parallel second gusset coupling a first panel and an opposite second panel together, and the first panel and the second panel are further coupled together along a base edge. The method comprises folding 610 the material from the first configuration into a second configuration by rotating the first and second panels about the base edge such that a first portion of the first panel overlaps a second portion of the first panel, a first portion of the second panel overlaps a second portion of the second panel, and the first gusset and the second gusset are substantially aligned with one another and with the base edge. The method further comprises removing 620 a first corner portion of the material to form a first seam edge by cutting the first corner portion substantially perpendicular to the first gusset, and sealing 630 the first seam edge. The method still further includes removing 640 a second corner portion of the material opposite the first corner portion to form a second seam edge by cutting the second corner portion substantially perpendicular to the second gusset, and sealing 650 the second seam edge. The method also comprises 660 positioning the disposable liner for insertion into a litter box by rotating the first gusset about the first seam edge, and rotating the second gusset about the second seam edge.

Exemplary embodiments of a disposable litter box liner and methods of forming the liner have been described above in detail. The liner and method of forming the liner are not limited to the specific embodiments described herein, but rather, components of the container and/or steps of the method may be utilized independently and separately from other components and/or steps described herein. Further, the described components and/or method steps can also be defined in, or used in combination with, other apparatus and/or methods, and are not limited to practice with only the apparatus and method as described herein.

While the invention has been described in terms of various specific embodiments, those skilled in the art will recognize that the invention can be practiced with modification within the spirit and scope of the claims.

What is claimed is:

1. A disposable liner for a litter box comprising:
a planar base sheet comprising a first end edge, a second end edge opposite the first end edge, a first seam edge, and a second seam edge opposite the first seam edge, the first seam edge and the second seam edge extending between the first end edge and the second end edge, the base sheet having a flat, rectangular shape defined by the first and second seam edges and the first and second end edges;
a first side wall coupled to the base sheet at the first end edge, the first side wall comprising a first top edge;
a second side wall coupled to the base sheet at the second end edge, the second side wall comprising a second top edge;
a first end wall coupled to the base sheet at the first seam edge, the first end wall comprising a first gusset integrally formed with the first end wall;
a second end wall coupled to the base sheet at the second seam edge, the second end wall comprising a second gusset integrally formed with the second end wall;
a flap portion extending along the first side wall, the second side wall, the first end wall, and the second end wall, the flap portion defining the first top edge and the second top edge; and
a tying member positioned inside the flap portion for closing the liner, wherein the first gusset extends from the first seam edge to the flap portion and the second gusset extends from the second seam edge to the flap portion.

2. The liner according to claim 1, wherein the liner further includes a first and second fold line located along the first side wall, and a third and fourth fold line along the second side wall, wherein the first, second, third and fourth fold lines are configured to enable adjusting a shape of the liner for improved fit within the litter box.

3. The liner according to claim 1, wherein the first top edge and the second top edge at least partially define an opening portion of the liner.

4. The liner according to claim 3, wherein the first side wall, the second side wall, the first end wall, the second end wall, and the base sheet define an interior cavity of the liner.

5. The liner according to claim 1, wherein the liner is formed of at least one of a flexible low density polyethylene material and a flexible high density polyethylene material.

6. The liner according to claim 1, wherein the tying member is a drawstring.

7. The liner according to claim 1, wherein the flap portion comprises an elastic material for securing the liner on a litter box.

8. The liner according to claim 1, wherein the base sheet is free of fold lines.

9. A method for forming a disposable liner for a litter box from a material in a first configuration that includes a first gusset and an opposite substantially parallel second gusset coupling a first panel and an opposite second panel together, the first panel and the second panel further coupled together along a base edge, the method comprising:
folding the material from the first configuration into a second configuration by rotating the first and second panels about the base edge such that a first portion of the first panel overlaps a second portion of the first panel, a first portion of the second panel overlaps a second portion of the second panel, and the first gusset and the second gusset are substantially aligned with one another and with the base edge; and
removing a first corner portion of the material to form a first seam edge by cutting the first corner portion substantially perpendicular to the first gusset;
sealing the first seam edge;
removing a second corner portion of the material opposite the first corner portion to form a second seam edge by cutting the second corner portion substantially perpendicular to the second gusset;
sealing the second seam edge; and
positioning the disposable liner for insertion into a litter box by rotating the first gusset about the first seam edge, and rotating the second gusset about the second seam edge.

10. The method according to claim 9, wherein in the first configuration the first gusset and the second gusset are substantially perpendicular to the base edge, and in the second configuration the first gusset and the second gusset are substantially aligned with the base edge.

11. The method according to claim 9, wherein positioning the disposable liner for insertion into a litter box includes forming an interior cavity of the liner defined by the base, a first side wall, a second side wall, a first end wall, and a second end wall.

12. The method according to claim 11, wherein the base used to form the interior cavity includes is at least one of square-shaped and rectangular-shaped base.

13. A litter box system comprising:
a litter box for an animal;
a disposable liner cavity suitable for lining the litter box comprising;
a planar base sheet comprising a first end edge, a second end edge opposite the first end edge, a first seam edge, and a second seam edge opposite the first seam edge, the base sheet having a flat, rectangular shape defined by the first and second seam edges and the first and second end edges;
a first side wall coupled to the base sheet at the first end edge, the first side wall comprising a first top edge;
a second side wall including a second top edge coupled to the base sheet at the second end edge, the second side wall comprising a second top edge;
a first end wall coupled to the base sheet at the first seam edge, the first end wall comprising:
a first gusset integrally formed with the first end wall;
a second end wall coupled to the base sheet at the second seam edge, the second end wall comprising:
a second gusset integrally formed with the second end wall;
a flap portion extending along the first side wall, the second side wall, the first end wall, and the second end wall, the flap portion defining the first top edge and the second top edge; and
a tying member positioned inside the flap portion for closing the liner cavity and removing the disposable liner from the litter box, wherein the first gusset extends from the first seam edge to the flap portion and the second gusset extends from the second seam edge to the flap portion.

14. The liner according to claim 13, wherein the liner is configured to lie flat when in a closed configuration and configured for insertion into the litter box when in an open configuration.

15. The liner according to claim 13, wherein the first top edge and the second top edge at least partially define an opening portion of the liner.

16. The liner according to claim 13, wherein the liner is formed of at least one of a flexible low density polyethylene material, and a flexible high density polyethylene material.

17. The liner according to claim 13, wherein the tying member is a drawstring.

18. The liner according to claim 13, wherein the flap portion comprises an elastic material for securing the liner on the litter box.

19. The liner according to claim 13, wherein the litter box comprises a bottom surface, and wherein the base sheet is sized to line the bottom surface of the litter box and prevent folds from forming in the base sheet.

20. The liner according to claim 19, wherein the base sheet is free of fold lines.

\* \* \* \* \*